(12) United States Patent
Peller

(10) Patent No.: US 6,784,569 B1
(45) Date of Patent: Aug. 31, 2004

(54) DATA BUS FOR A PLURALITY OF NODES

(75) Inventor: Martin Peller, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 09/623,897

(22) PCT Filed: Feb. 23, 1999

(86) PCT No.: PCT/EP99/01172
§ 371 (c)(1),
(2), (4) Date: Sep. 11, 2000

(87) PCT Pub. No.: WO99/46896
PCT Pub. Date: Sep. 16, 1999

(30) Foreign Application Priority Data

Mar. 10, 1998 (DE) .......................................... 198 10 288

(51) Int. Cl.⁷ ................................................ H03K 3/00
(52) U.S. Cl. ...................... 307/106; 375/229; 375/232; 375/253; 398/62
(58) Field of Search .......................... 307/106; 375/229, 375/232, 233; 398/62; 385/100

(56) References Cited

U.S. PATENT DOCUMENTS

| 4,644,587 A | * | 2/1987 | Takahashi et al. | ........... 455/601 |
| 5,101,456 A | * | 3/1992 | Islem | .......................... 385/32 |
| 5,955,921 A | * | 9/1999 | Nobuhara et al. | .......... 330/254 |

* cited by examiner

Primary Examiner—Robert DeBeradinis
(74) Attorney, Agent, or Firm—Crowell & Moring LLP

(57) ABSTRACT

A data bus arrangement and method for connecting a plurality of nodes to one another through a star coupler arrangement of a data bus which uses a logical decision gate having a plurality of inputs corresponding to said plurality of nodes wherein the logical decision gate inputs receive electrical signals and outputs an electrical signal to be routed back to each of said plurality of nodes. Some of the nodes are connected through opt0-electric transducers to the inputs of the logical decision gate. These transducers convert optical input signals from the nodes to electric signals to the inputs of the logical decision gate and also convert the output from the logical decision gate back to optical signals to the nodes. A signal conditioning circuit modifies the output signal of the logical decision gate.

4 Claims, 2 Drawing Sheets

DATA BUS FOR A PLURALITY OF NODES

CROSS-REFERENCE TO RELATED APPLICATIONS

This application is related to co-pending application Ser. No. 09/646,006, filed Nov. 13, 2000; Ser. No. 09/623,896, filed Sep. 11, 2000; Ser. No. 09/623,852, filed Oct. 30, 2000; Ser. No. 09/623,853, filed Nov. 8, 2000; Ser. No. 09/623,898, filed Nov. 16, 2000; and Ser. No. 09/623,894, filed Nov. 21, 2000.

BACKGROUND AND SUMMARY OF THE INVENTION

This application claims the priority of German Patent Document 198 10 288.7 filed Mar. 10, 1998 and PCT/EP99/01172 filed Feb. 23, 1999, the disclosures of which is expressly incorporated by reference herein.

The invention relates to a data bus for a plurality of nodes which exchange data messages among one another via at least one electrical line. The line may be a component of a star coupler. Such a data bus is known from the previously unpublished German patent application 19720401.

The circuitry of such a data bus may be implemented in the form of an open collector circuit. An open collector circuit has the disadvantage that, at high transmission rates and with many bus nodes, a relatively low resistance must be used as the collector resistance in order to obtain sufficient edge steepness of the signal messages which are present in pulse form. This leads to high currents and high sower dissipation and the necessity of using power transistors and resistors. A further problem results when at least one part of the nodes supplies optical messages.

Particularly if the number of bus nodes is large, signal amplification is required to supply the messages in an adequate quality to all nodes. For this purpose it is suitable to convert the messages into electrical form, to amplify them and to reconvert them into optical form. However, this double conversion with additional signal amplification, however, causes signal distortions that reduce data bus efficiency.

For a data bus designed as an open collector circuit, it is known in the art to provide signal shaping devices (cf. U.S. Pat. No. 5,684,831 A). Such a signal sloping device for each node results in high circuit complexity, particularly if there are many nodes.

The object of the invention is to create a data bus which provides interference-free bus communication with low circuit complexity even for a large number of optical bus nodes.

The invention consists of a logic decision gate and the signal conditioning circuit and their interaction. The decision gate does not require complex signal shaping devices for its use because it transmits the signals in their unchanged form. Moreover, the power requirement is low even if the number of nodes is large. The logic decision gate also makes it possible to significantly reduce the circuit complexity. It is only necessary to arrange a single signal conditioning circuit which models the output signal of the decision gate with regard to the pulse shape between the decision gate and the inputs of the nodes.

The shape of the output signal is matched to the shape of the input signal or of an adaptation as described in U.S. Pat. No. 5,684,831 A. The rising edges are flattened to make it possible to distinguish the useful signals from high-frequency noise signals with extreme edge steepness.

Embodiments of the invention are possible both with nodes that supply electrical data messages as well as with nodes that generate optical data messages. The latter nodes are connected to the data bus via opto-electric transducers in such a way that the signal outputs of the nodes are each routed to the decision gate via a transducer of this type, and the output of the decision gate is routed to the inputs of the nodes via a common electro-optical transducer or via individual transducers of this type.

Other objects, advantages and novel features of the present invention will become apparent from the following detailed description of the invention when considered in conjunction with the accompanying drawings.

DETAILED DESCRIPTION OF THE PREFERRED EMBODIMENTS

The data bus shown in

Figure 1:
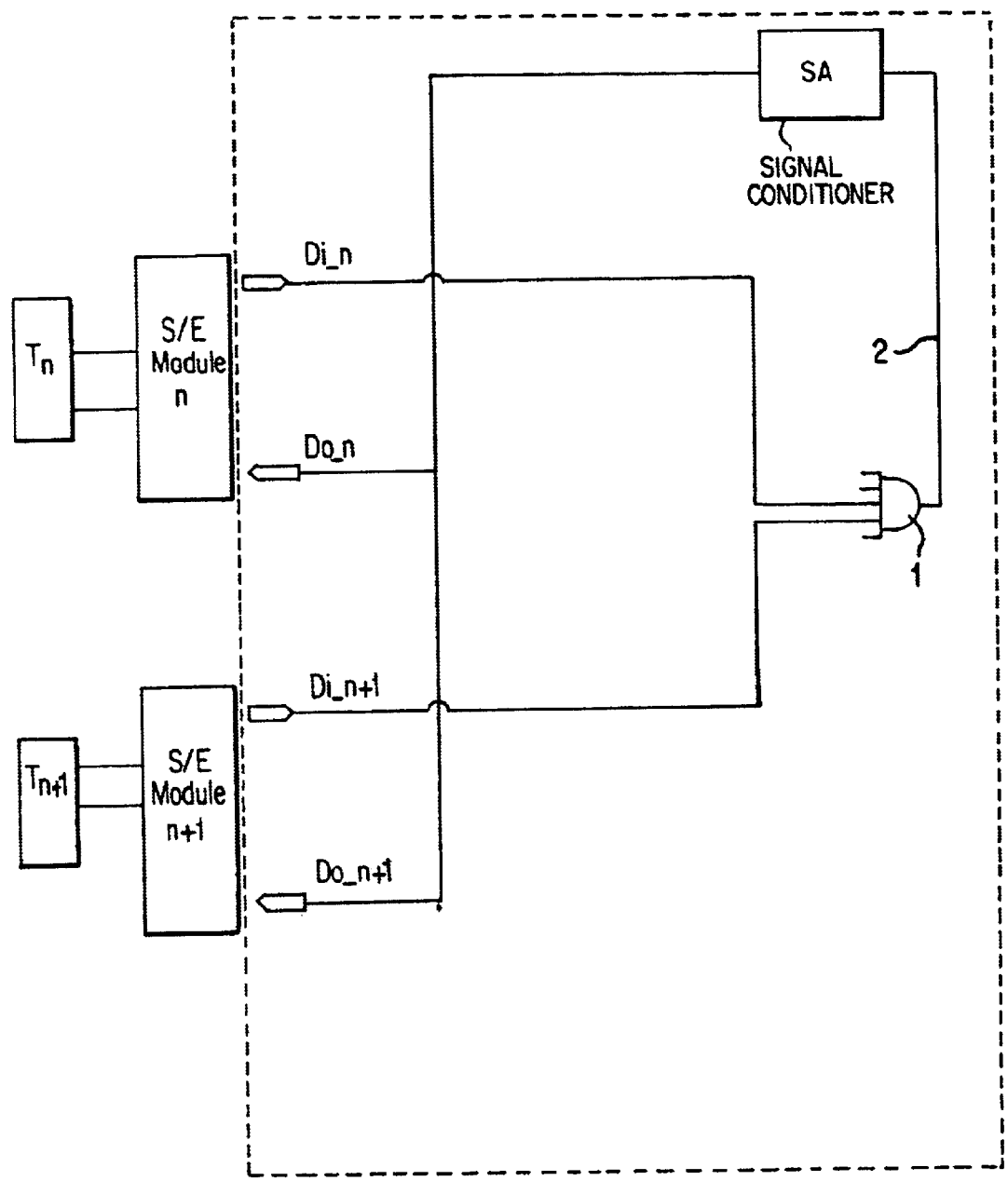
FIG. 1 schematically shows the structure of a data bus according to the invention, which achieves reliable bus communication for a plurality of bus nodes with little circuit complexity.
Figure 2:
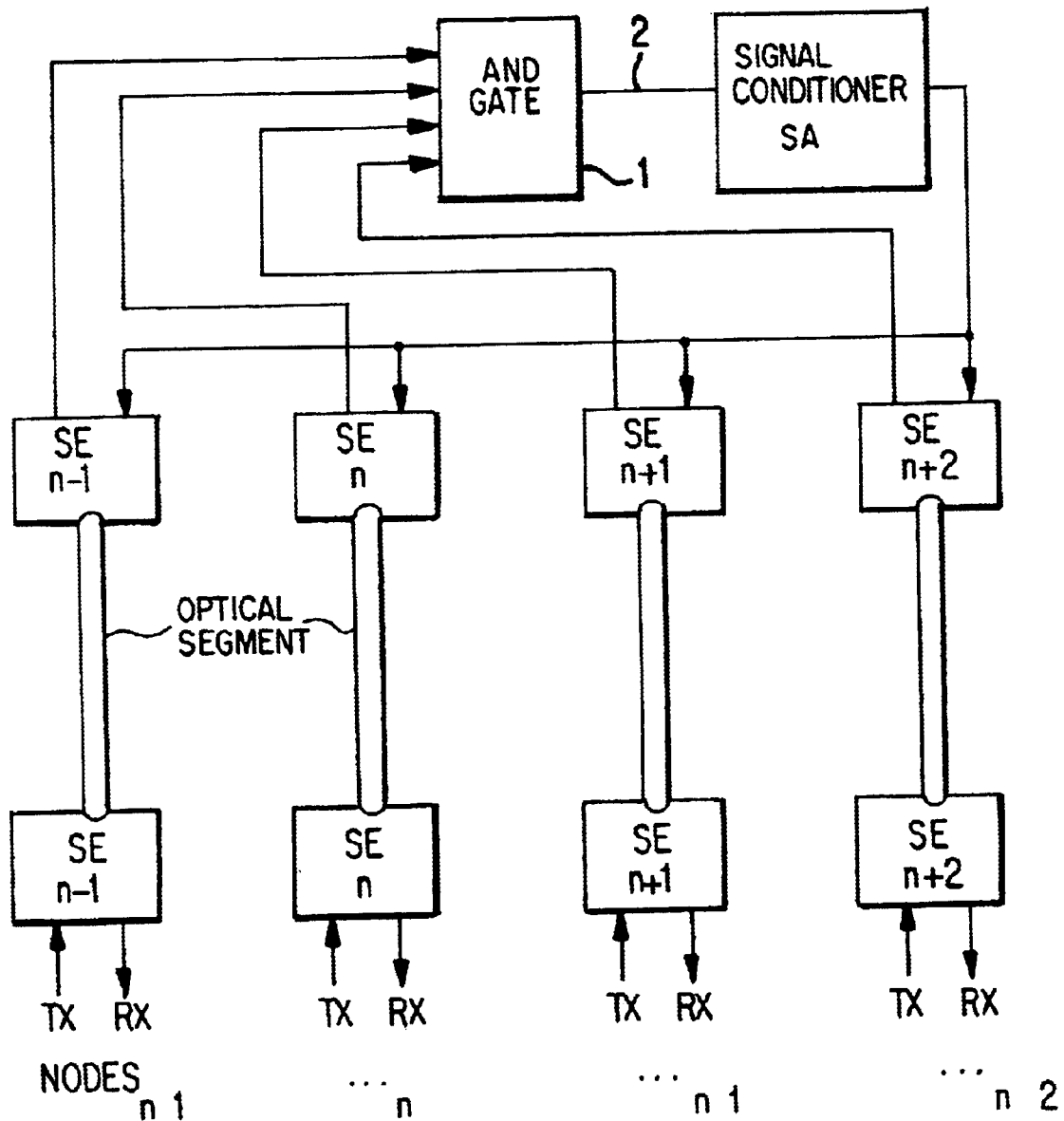
FIG. 2 is a further embodiment of the invention.

FIGS. 1 and 2 serves to connect nodes to one another. The nodes supply optical messages. The messages of the nodes (for reasons of clarity, FIG. 1 shows two nodes $T_n$ and $T_{n+1}$) are routed as input signals to the inputs of opto-electronic signal transducers $S/E_n$ and $S/E_{n+1}$. The electrical output signals ($Di\_n$, $Di\_{n+1}$) of the transducers are linked to an AND gate 1. The number of inputs and outputs of the gate corresponds to the number of the bus nodes. The output 2 of the AND gate 1 drives all the inputs ($Do_n$, $Do_{n+1}$) of the transducers $S/E_n$ and $S/E_{n+1}$. The transducers supply pulse-shaped optical output signals, which deliver these messages to the nodes via optical transmission segments.

In this manner, each node receives all the messages sent by the other nodes as well as its own message in return. The AND gate 1 has a substantially lower power requirement than the initially mentioned open collector circuit.

A signal conditioning device SA is positioned on the output of the AND gate 1. During the conversion of an electrical signal into an optical signal, pulse distortion occurs. This is caused, for example, by the fact that threshold tracking of an optical receiver cannot occur in an infinitely short time, or by nonlinearities of the characteristics of optical components.

In the system shown, pulse distortions on the order of 15–20 ns are expected per optical transmission segment with one opto-electric respectively electro-optic transducer each. Since the nodes are connected via two transmission segments each, this pulse distortion adds up to 30–40 ns in the worst case. For a target data rate of 10 Mbit/s and, for example, NRZ (non-return-to-zero) coding, the bit time is 100 ns. Due to the pulse distortion, a bit can "shrink" to a duration of 60–70 ns. The distortion adds up to 30% of the signal length. As a result, a complex sampling process with at least 8 times sampling must be used, which is furthermore sensitive to crystal jitter.

Through the use of signal conditioning SA at the output of the AND gate in the data bus, the NRZ coded signals are returned into a 100 ns bit time form without pulse distortion. This makes it possible, for example, to eliminate signal shape distortions, such as may be generated by opto-electric transducers ($S/E_n$, $S/E_{n+1}$).

For signal conditioning in the SA device, it is possible to use, for example, the same sampling method as that employed for the individual nodes. It is also possible to use a special signal conditioning process that takes into account special boundary conditions in the data bus.

As a result, data transmission becomes substantially more robust. Short glitches can be filtered out. The sampling method requirements in the individual nodes can be set lower or the tolerance to pulse distortions on a transmission segment can be increased. The sampling method is clearly less susceptible to crystal jitter. With identical robustness, lower frequency crystals can be used, which provides cost advantages.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A data bus arrangement for connecting a plurality of nodes to one another, said arrangement comprising:
    a logic decision gate having a plurality of inputs for receiving a corresponding plurality of first electrical signals routed from said plurality of nodes wherein an output of the logical decision gate is connected in parallel to provide second electrical output signals routed to each of said plurality of nodes;
    a plurality of opto-electrical transducers, each of said plurality of opto-electrical transducers connected between one of said nodes and one of said inputs of said logic decision gate wherein the output of said logic decision gate is fed to an electrical input of said each said opto-electrical transducers;
    a signal conditioning circuit arranged between said logical decision gate and the inputs of said nodes in order to provide a pulse shaping function for the output signal of said logical decision gate.

2. The data bus arrangement according to claim 1, wherein said signal conditioning circuit modifies the output signal of the decision gate in order to compensate for distortion generated by said opto-electric transducers.

3. A method for connecting a plurality of nodes to one another through a data bus configuration, said method comprising the steps of:
    routing each of a plurality of outputs from said plurality of nodes to an input of a plurality of inputs of a logic decision gate wherein at least one of said outputted routed signals is fed through an opto-electric transducer to provide an electric signal to at least one input of said logic decision gate;
    outputting a signal said logic decision gates and routing said output signal to an input of each of said plurality of nodes;
    performing signal conditioning on said output signal of said logic decision gate in order to shape the pulse of said output signal in order to compensate for distortion in each of said opto-electric transducers when converting between optical and electrical signal.

4. The method according claim 3, wherein the signal conditioning adapts the pulse shape of the output signal of the decision gate to the pulse shape of input signals to said transducers.

* * * * *